(12) United States Patent
Durcholz et al.

(10) Patent No.: US 12,379,476 B2
(45) Date of Patent: Aug. 5, 2025

(54) TR-343 ISOLATION RING TEST FIXTURE

(71) Applicant: The United States of America, as represented by the Secretary of the Navy, Crane, IN (US)

(72) Inventors: Nathan Durcholz, Jasper, IN (US); Eric W. Schaefer, Huntingburg, IN (US); Brooke Jones, Loogootee, IN (US)

(*) Notice: Subject to any disclaimer, the term of this patent is extended or adjusted under 35 U.S.C. 154(b) by 433 days.

(21) Appl. No.: 18/072,993

(22) Filed: Dec. 1, 2022

(65) Prior Publication Data

US 2024/0183964 A1 Jun. 6, 2024

(51) Int. Cl.
*G01S 7/52* (2006.01)
(52) U.S. Cl.
CPC ................................ *G01S 7/52004* (2013.01)
(58) Field of Classification Search
CPC .................................................. G01S 7/52004
See application file for complete search history.

(56) References Cited

U.S. PATENT DOCUMENTS

2012/0048656 A1* 3/2012 West ................... G01R 31/2891
187/250

* cited by examiner

*Primary Examiner* — Timothy P Graves
(74) *Attorney, Agent, or Firm* — Naval Surface Warfare Center, Crane Division; Christopher Feigenbutz

(57) ABSTRACT

Provided is a test fixture for testing sonar transducer isolation rings. The fixture includes a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead. An Isolation Ring can be placed on the base for electrical and mechanical testing in order to detect dimensional tolerances and for voids or other area of insulating weakness caused during manufacturing. Additionally, the weight reduces strain and risk of injury to the operator while providing a repeatable pressure on the Isolation Rings during testing. The precise locating provided by the weight shafts and dowel pin eliminates operator error and accurately and consistently locates mating parts.

7 Claims, 7 Drawing Sheets

TR-343 ISOLATION RING TEST FIXTURE

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200607US01) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to sonar transducers. More particularly, it pertains to a fixture for testing sonar transducer isolation rings.

BACKGROUND

The TR-343 Transducer is a sonar transducer deployed on various ships. An Isolation Ring is an epoxy fiberglass laminate that is part of the TR-343. Two Isolation Rings, P1 and P2, are used per transducer. One Isolation Ring is placed on the top and one is placed on the bottom of the Ceramic Stack Assembly (CSA) inside the TR-343 Transducer. The Isolation Rings electrically isolate the CSA from the rest of the TR-343 Transducer. During active mode operation, the TR-343 Transducer CSA is charged with high voltage at the ceramic's resonant frequency. This causes the CSA to rapidly expand and contract, which in turn resonates the Boot Assembly (BA). During passive mode operation, the vibrations in the water cause the CSA to expand and contract, creating electrical current that travels back to the signal processor and to a display console. Isolation Rings must acoustically couple with the BA for efficient TR-343 Transducer operations. Additionally, Isolation Rings must have adequate tensile, flexural, and compressive strength to resist shock and vibrations in the TR-343 Transducer.

Electrical and dimensional inspections must be performed on every lot of isolation rings received to ensure functionality. Historic inspection methods are cumbersome, inaccurate, and time consuming. Previously, a quality assurance inspector used micrometers and dial calipers on each isolation ring to measure the physical dimensions and to ensure that the isolation rings were within specifications. This process was extremely time consuming. Lack of operator training on the proper use of the measuring devices and the difficult to measure parts lead to inconsistent and inaccurate measurements.

Electrical testing of these components was equally cumbersome. For electrical testing, a test fixture fabricated from a TR-343 Transducer Head Mass, Tail Mass, and CSA where the Isolation Ring was inserted into the test fixture just as it would be normally installed. This test setup, however, did not test the entire surface area of the isolation rings for voids or other areas of weak insulation. Additionally, the test was potentially destructive. The inspector was required to lift the heavy tail mass and place it on the top of the apparatus. Pinched and damaged rings were common because the components were not properly aligned during assembly. Inspector fatigue and injury were also a major concern with the lifting process. All of these issues resulted in artificially high failure rates during the incoming inspection process.

SUMMARY OF THE INVENTION

The present invention relates to a test fixture for testing sonar transducer isolation rings. The fixture includes a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead. An Isolation Ring can be placed on the base for electrical and mechanical testing in order to detect dimensional tolerances and for voids or other area of insulating weakness caused during manufacturing. Additionally, the weight reduces strain and risk of injury to the operator while providing a repeatable pressure on the Isolation Rings during testing. The precise locating provided by the weight shafts and dowel pin eliminates operator error and accurately and consistently locates mating parts.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
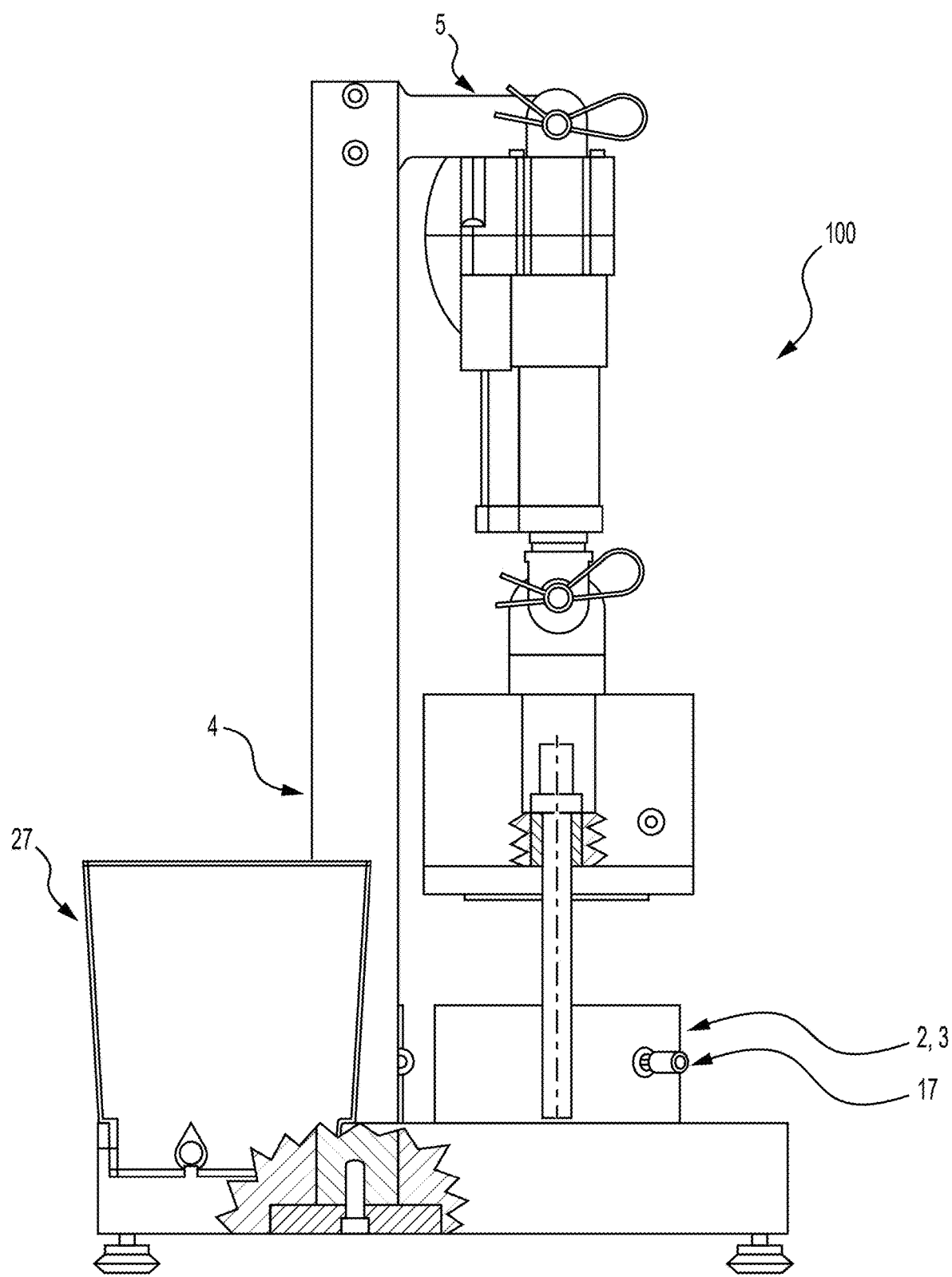
FIG. 1 shows a front view of the Isolation Ring Test Fixture.

The embodiments of the invention described herein are not intended to be exhaustive or to limit the invention to precise forms disclosed. Rather, the embodiments selected for description have been chosen to enable one skilled in the art to practice the invention.

Generally, provided is a test fixture for testing isolation rings comprising: a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead.

In an illustrative embodiment, the interchangeable isolation ring mounting bases act as a gauge to determine if said isolation rings are within dimensional tolerance. In an illustrative embodiment, the interchangeable isolation ring mounting bases gauge dimensional tolerance by mating with said isolation ring. In an illustrative embodiment, a dowel mounted to said stand allows for alignment of said interchangeable isolation ring mounting bases to said weight. In an illustrative embodiment, a pair of T-slots are machined into said base prevent said base from rotating about said dowel.

In an illustrative embodiment, also provided is a method for testing isolation rings comprising: providing a test fixture for testing isolation rings comprising: a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead; raising said weight with said linear actuator, connecting a negative lead from said electrical test unit to said weight and a ground to said mounting post; selecting one of said interchangeable isolation ring mounting bases and connecting a positive lead from said electrical test unit; extending said linear actuator to lower said weight onto said selected interchangeable isolation ring mounting base; performing a test to confirm that said test fixture is operating correctly; retracting said linear actuator to raise said weight, placing said Isolation Ring on said selected interchangeable isolation ring mounting base, lowering said weight, and checking for dimensional tolerance; and performing a Hi-Pot test to test for dimensional tolerance and for voids or insulating weakness.

In an illustrative embodiment, also provided is a method for testing isolation rings comprising: providing a test fixture for testing isolation rings comprising: a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead; placing said Isolation Ring on said selected interchangeable isolation ring mounting base, lowering said weight, and checking for dimensional tolerance; and performing a Hi-Pot test to test for dimensional tolerance and for voids or insulating weakness.

Figure 2:
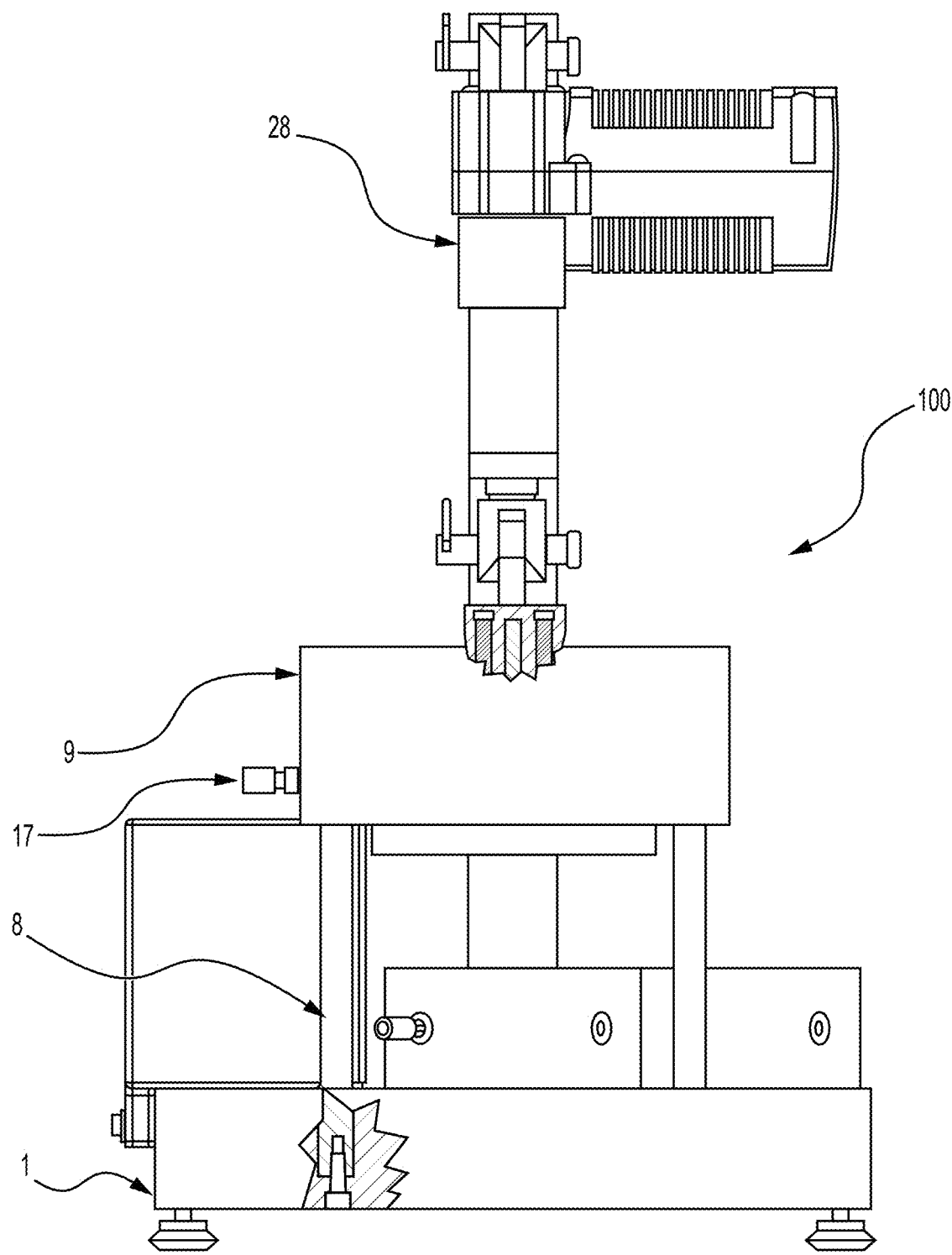
FIG. 2 shows a rear view of the Isolation Ring Test Fixture.

FIGS. 1 and 2 show views of the Isolation Ring Test Fixture 100. The device comprises a stand 1, a P1 and a P2 interchangeable base 2, 3, a mounting post 4, an actuator mounting bracket 5, a linear actuator 28, a weight alignment shaft 8, and a weight 9. In an illustrative embodiment, the stand 1 is constructed from a nonconductive material. In an illustrative embodiment, the nonconductive material is G10. The stand 1 is used to isolate the test fixture 100 from the work surface.

Figure 3:
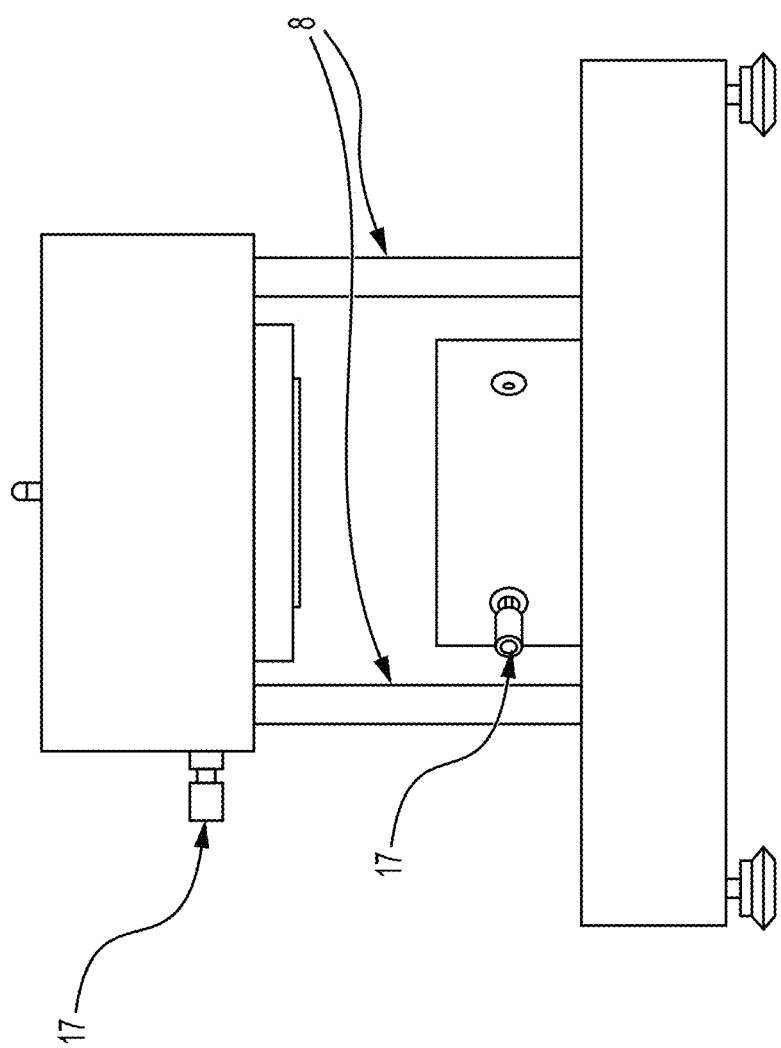
FIG. 3 shows a view of the Isolation Ring Test Fixture Alignment.

The linear actuator 28 raises and lowers the weight 9 during test procedures. The linear actuator 28 is connected to an actuator controller 27, which is plugged directly into a power source (not shown). In an illustrative embodiment, the power source is an electrical outlet. The horizontal movement of the weight 9 is constrained by the alignment shafts 8, as shown in FIG. 3. In an illustrative embodiment, the horizontal movement is further constrained by one or more linear bearings that permit the weight 9 to move along the alignment shafts 8 without the need for grease. The alignment shafts 8 allow the weight 9 to consistently mate with the isolation ring to be tested (not shown) and the selected interchangeable isolation ring mounting base 2, 3. A High Potential electrical test unit (Hi-Pot) is connected to the weight 9 and selected interchangeable isolation ring mounting base 2 using test leads 17. The Hi-Pot test unit applies an extremely high voltage to the fixture 100 to ensure the Isolation Rings are able to properly electrically insulate their mating parts.

Figure 4:
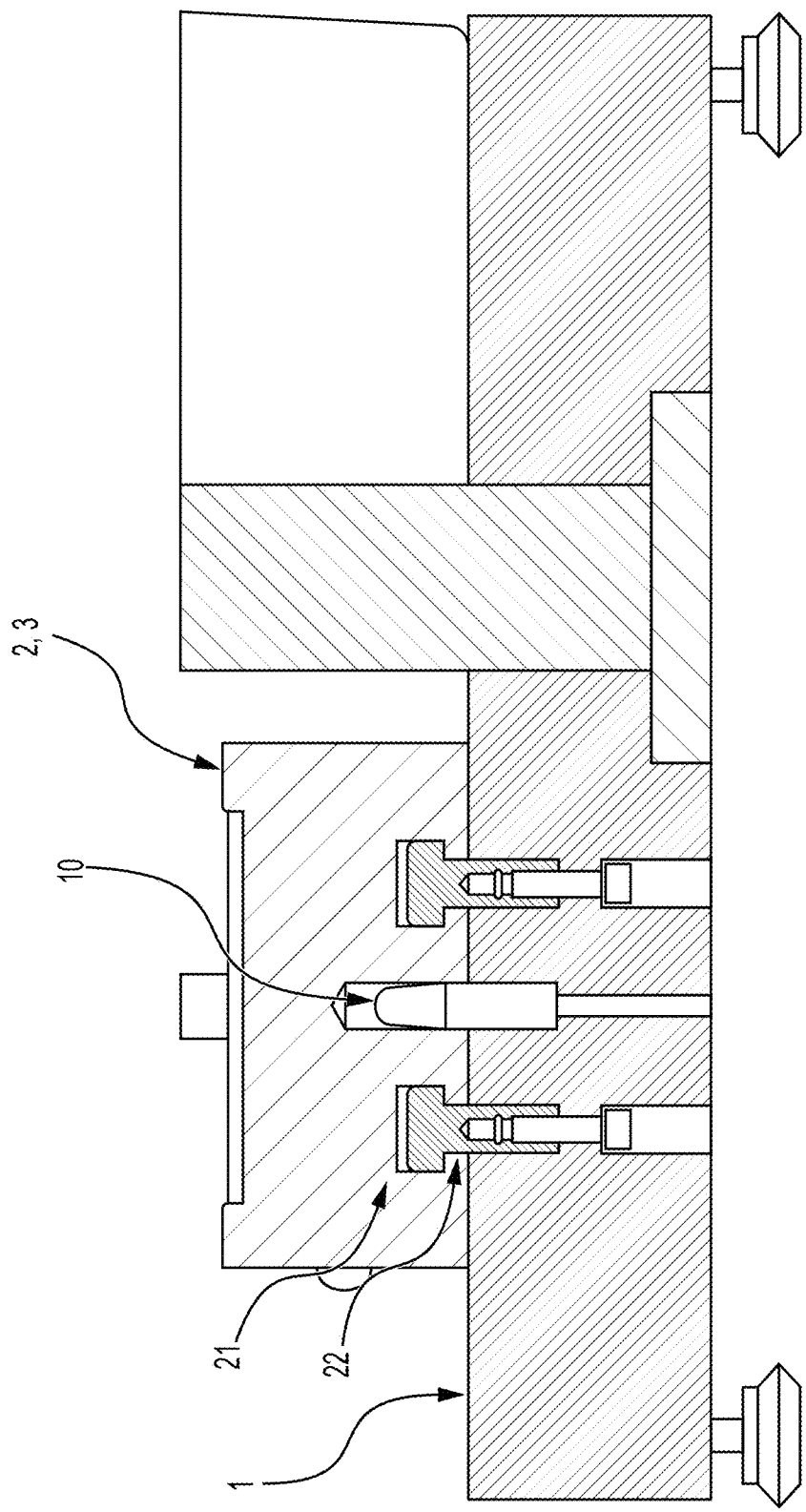
FIG. 4 shows a view of the stand and dowel.
Figure 5:
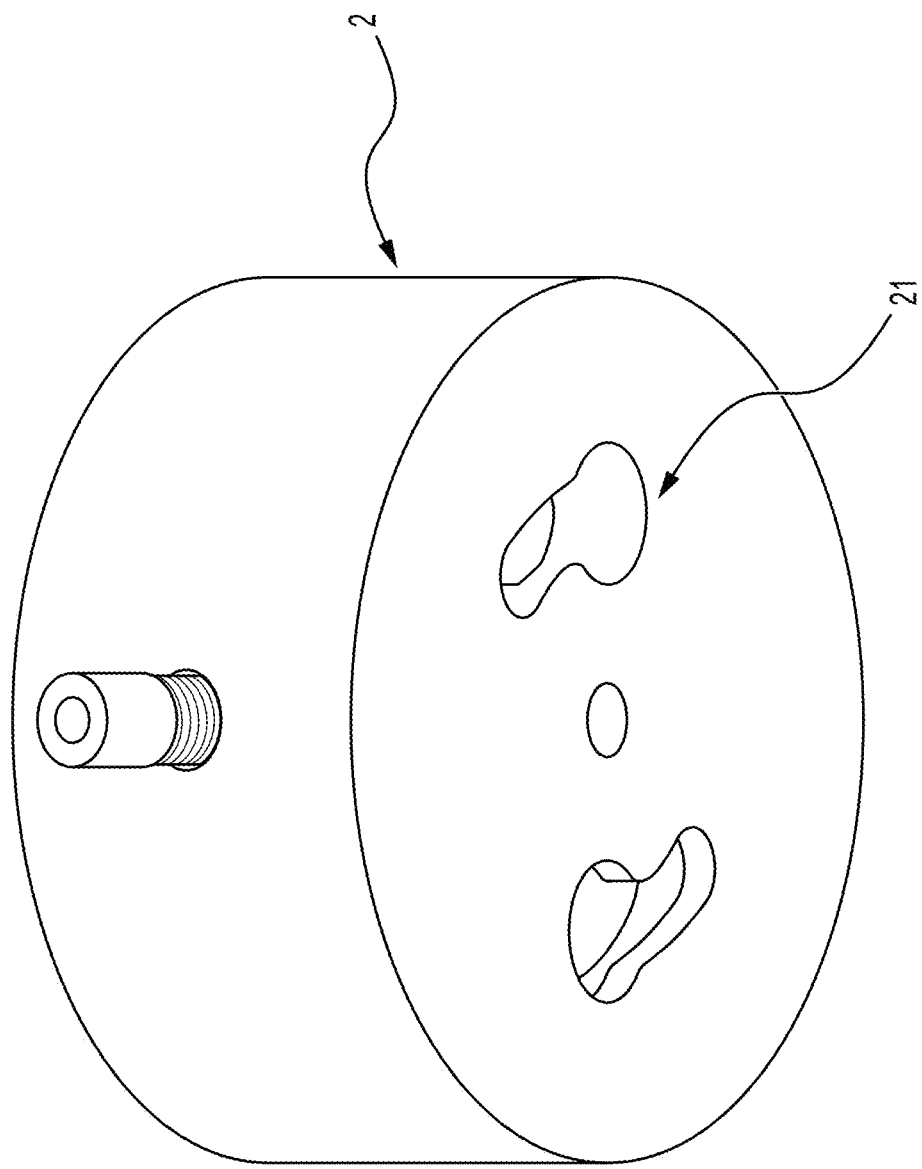
FIG. 5 shows a view of the interchangeable P1 base.

FIG. 4 shows a view of the stand 1 and dowel 10, and FIG. 5 shows a view of the interchangeable P1 base 2, 3. In an illustrative embodiment, a precisely machined and located dowel 10 mounted to the stand 1 allows for quick and efficient alignment of the P1 and P2 bases 2, 3, to the weight 9. The interchangeable P1 base 2 can lock onto the stand 1 via a pair of T-slots 21 that are machined into the bottom of the base 2 and interface with threaded bolts 22 mounted to the stand 1. The T-slot 21 configuration prevents the bases 2, 3 from rotating about the dowel 10 and securely fastens the bases 2, 3 to the stand 1. The design allows the bases 2, 3, to remain in a consistent position during testing, while still being easily interchangeable.

Figure 6:
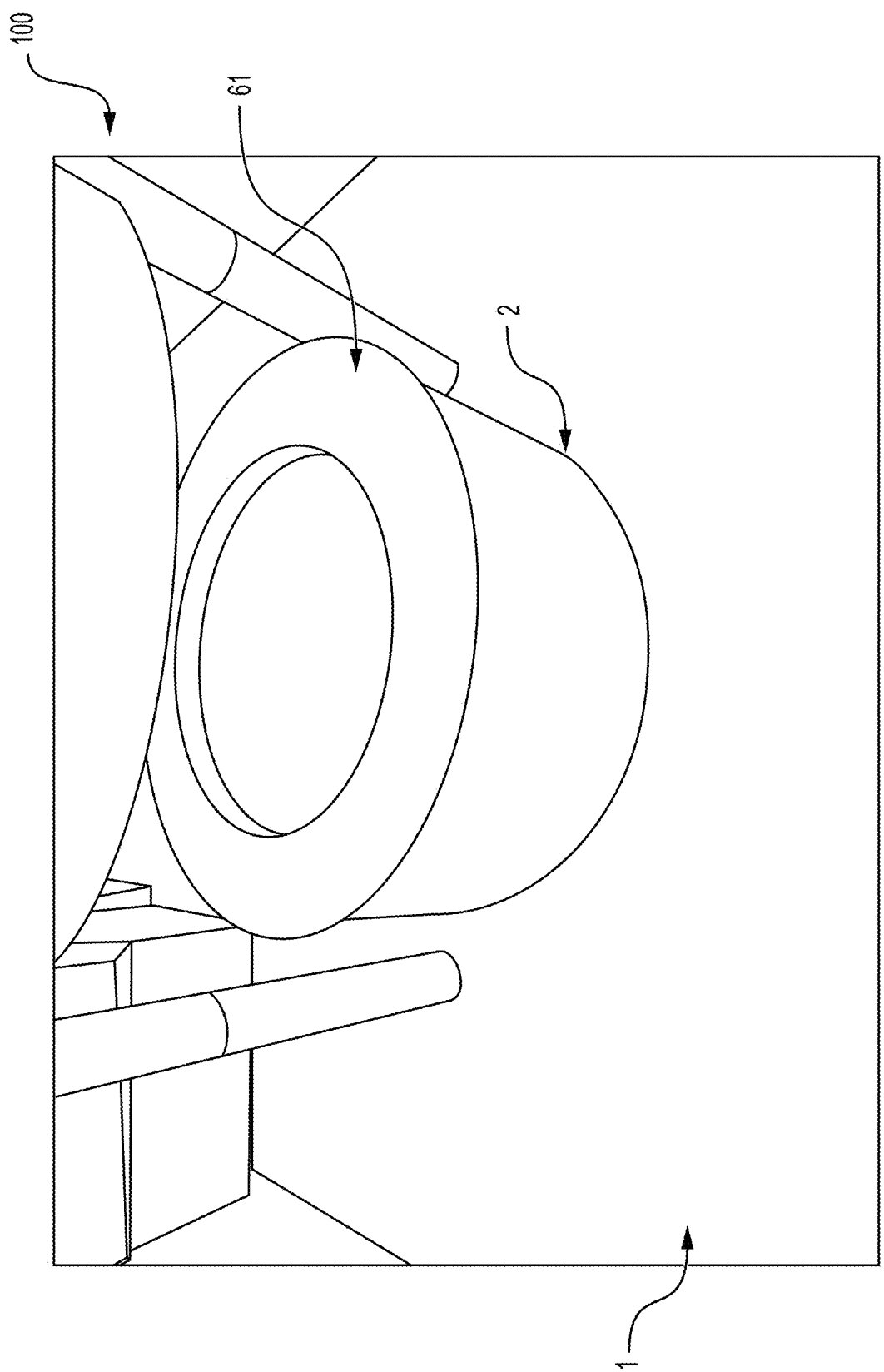
FIG. 6 shows a view of the Isolation Ring on the Isolation Ring Test Fixture.
Figure 7:
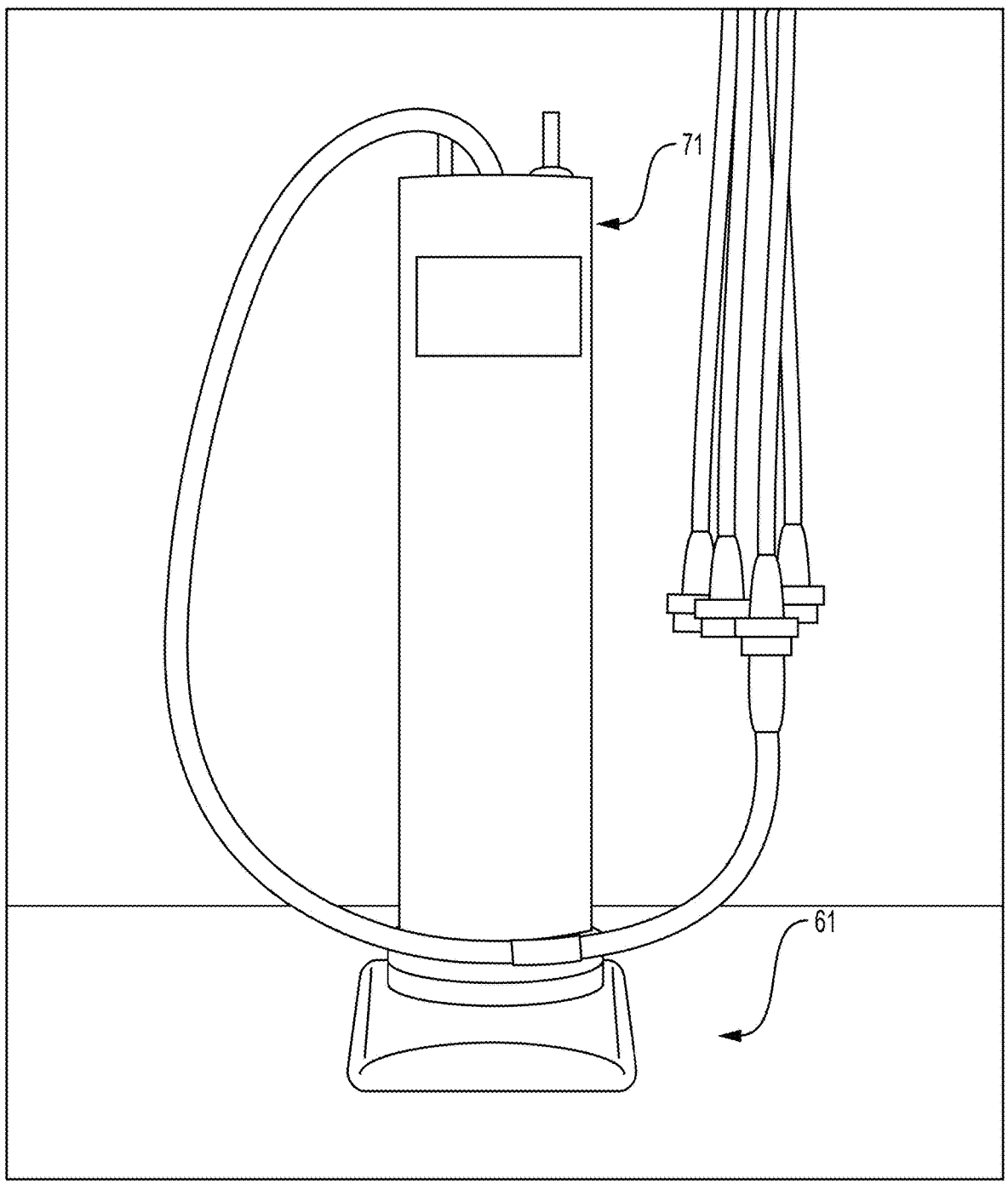
FIG. 7 shows a view of the TR-343 Transducer.

FIG. 6 shows a view of the Isolation Ring 61 on the Isolation Ring Test Fixture 100, and FIG. 7 shows a view of the TR-343 Transducer 71. The TR-343 Transducer 71 is a sonar transducer deployed on various ships. The Isolation Ring 61, an epoxy fiberglass laminate, is a piece part of the TR-343 71. Two Isolation Rings, P1 and P2, are used per transducer. One Isolation Ring is placed on the top and one on the bottom of the Ceramic Stack Assembly (CSA) inside the TR-343 Transducer 71. The Isolation Rings electrically isolate the CSA from the rest of the TR-343 Transducer 71. During active mode operation, the TR-343 Transducer CSA is charged with high voltage at the ceramic's resonant frequency. This causes the CSA to rapidly expand and contract, which in turn resonates the Boot Assembly (BA). During passive mode operation, the vibrations in the water cause the CSA to expand and contract, creating electrical current that travels back to the signal processor and to a display console.

The Isolation Ring 61 is positioned on the base 2, 3 on top of the stand 1. The mating surfaces of the weight and P1 and P2 bases 2, 3, are strategically designed to act as a gauge to determine if the Isolation Rings 61 are in dimensional tolerance. This is completed in two strategies. The mating surfaces are manufactured to mimic the maximum material condition of the Head Mass, Tail Mass and their corresponding CSA mating surfaces. All of the functionally important dimensions are checked via this method. If the Isolation Rings 61 are not dimensionally correct, they will either not properly mate with the test fixture 100 or they will fail Hi-Pot testing. Hi-Pot testing failure will be seen because the correct amount of surface area of the test fixture 100 will not be electrically insulated. Also, electrical failure will occur if there are any voids, cracks, or areas or weakness in the epoxy; an extremely common issue due to improper manufacturing techniques.

The operation of the test fixture is as follows. First, ensure the weight is in its raised position using the actuator. Check that the negative lead from the Hi-Pot tester is attached to the weight and the ground is attached to the rear of the actuator support. Next, select the base that corresponds to the isolation ring being tested. Attach the base to the stand using the T-slots and connect the positive lead from the Hi-Pot tester. Extend the actuator to lower the weight onto the base and run a preliminary test to confirm that the fixture is operating correctly. The Hi-Pot should fail immediately. Next, retract the actuator to raise the weight and place the Isolation Ring on the base ensuring that the lip sits in the step. If the Isolation Ring does not go onto the base, the Isolation Ring is dimensionally out of tolerance. Lower the weight onto the Isolation Ring. No gap should be present between the mating surfaces. If a gap is present, the Isolation Ring is not dimensionally within tolerance. Next, perform the Hi-Pot test. If the test fails, one of two failures occurred. The least likely is that the Isolation Ring was not dimensionally correct, thus allowing electricity to arc between the weight and base. The more common failure is the Ring had a void or other area of insulating weakness caused during manufacturing.

Although the invention has been described in detail with reference to certain preferred embodiments, variations and modifications exist within the spirit and scope of the invention as described and defined in the following claims.

The invention claimed is:

1. A test fixture for testing isolation rings comprising:
a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead.

2. The test fixture of claim 1, wherein said interchangeable isolation ring mounting bases act as a gauge to determine if said isolation rings are within dimensional tolerance.

3. The test fixture of claim 2, wherein said interchangeable isolation ring mounting bases gauge dimensional tolerance by mating with said isolation ring.

4. The test fixture of claim 1, wherein a dowel mounted to said stand allows for alignment of said interchangeable isolation ring mounting bases to said weight.

5. The test fixture of claim 4, wherein a pair of T-slots are machined into said base prevent said base from rotating about said dowel.

6. A method for testing isolation rings comprising:
providing a test fixture for testing isolation rings comprising:
a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead;
raising said weight with said linear actuator, connecting a negative lead from said electrical test unit to said weight and a ground to said mounting post;
selecting one of said interchangeable isolation ring mounting bases and connecting a positive lead from said electrical test unit;
extending said linear actuator to lower said weight onto said selected interchangeable isolation ring mounting base;
performing a test to confirm that said test fixture is operating correctly;
retracting said linear actuator to raise said weight, placing said Isolation Ring on said selected interchangeable isolation ring mounting base, lowering said weight, and checking for dimensional tolerance; and
performing a Hi-Pot test to test for dimensional tolerance and for voids or insulating weakness.

7. A method for testing isolation rings comprising:
providing a test fixture for testing isolation rings comprising:
a stand, a pair of interchangeable isolation ring mounting bases, a mounting post, an actuator mounting bracket, a linear actuator, an actuator controller, a pair of weight alignment shafts, a weight, and an electrical test unit comprising a positive and a negative test lead;
placing said Isolation Ring on said selected interchangeable isolation ring mounting base, lowering said weight, and checking for dimensional tolerance; and
performing a Hi-Pot test to test for dimensional tolerance and for voids or insulating weakness.

* * * * *